United States Patent
Stearns et al.

(10) Patent No.: US 7,405,405 B2
(45) Date of Patent: Jul. 29, 2008

(54) METHOD AND SYSTEM FOR RECONSTRUCTING AN IMAGE IN A POSITRON EMISSION TOMOGRAPHY (PET) SYSTEM

(75) Inventors: Charles William Stearns, New Berlin, WI (US); Ravindra Mohan Manjeshwar, Guilderland, NY (US); Floribertus Philippus Martinus Heukensfeldt Jansen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 200 days.

(21) Appl. No.: 11/131,149

(22) Filed: May 17, 2005

(65) Prior Publication Data

US 2006/0261275 A1 Nov. 23, 2006

(51) Int. Cl.
*G01T 1/164* (2006.01)

(52) U.S. Cl. .................................. 250/363.03

(58) Field of Classification Search ............ 250/363.02, 250/363.03, 369; 382/131
See application file for complete search history.

(56) References Cited

U.S. PATENT DOCUMENTS

| | | | | |
|---|---|---|---|---|
| 5,272,343 A * | 12/1993 | Stearns | ................... | 250/363.03 |
| 5,532,489 A * | 7/1996 | Yamashita et al. | ...... | 250/363.03 |
| 5,703,369 A * | 12/1997 | Mori | ...................... | 250/363.03 |
| 6,255,655 B1 * | 7/2001 | McCroskey et al. | .... | 250/363.03 |
| 6,403,960 B1 * | 6/2002 | Wellnitz et al. | ......... | 250/363.09 |
| 2001/0043647 A1 * | 11/2001 | Belge | ........................... | 375/222 |
| 2007/0003132 A1 * | 1/2007 | Proksa et al. | ............... | 382/154 |

* cited by examiner

*Primary Examiner*—David P. Porta
*Assistant Examiner*—Carolyn Igyarto
(74) *Attorney, Agent, or Firm*—The Small Patent Law Group; Dean D. Small

(57) ABSTRACT

A method and system for reconstructing an image in a time-of-flight (TOF) positron emission tomography (PET) system is provided. The method includes using a reconstructed image to determine predicted timing information. Timing bias data is updated based on received timing information associated with acquired scan data from a PET system and the predicted timing information. The method further includes reconstructing the image, based on the updated timing bias data.

16 Claims, 7 Drawing Sheets

METHOD AND SYSTEM FOR RECONSTRUCTING AN IMAGE IN A POSITRON EMISSION TOMOGRAPHY (PET) SYSTEM

BACKGROUND OF THE INVENTION

This invention relates generally to medical imaging systems, and more particularly, to image reconstruction using Positron Emission Tomography (PET) systems.

A PET system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons are detected by detectors that are placed along the line of response on a detector ring. When these photons arrive and are detected at the detector elements at the same time, this is referred to as coincidence. An image is then generated, based on the acquired image data that includes the annihilation photon detection information.

In a PET system, the image quality depends on image statistics. The image statistics may be improved by acquiring the image data for longer durations. However, the total time required to acquire the image data is limited by the decay of the radioactive isotope used in the imaging process and by the inability of the patients to remain immobile for extended durations.

Image quality may be improved by including time-of-flight (TOF) information of the emission data. Strictly speaking, TOF is the time taken by an annihilation photon to travel from the origin of annihilation to detector elements along the line of response, but this cannot be measured directly since the time at which the emission takes place is not known. Therefore, TOF usually refers to the difference in the time at which the photons are detected by the detector elements. The timing difference is used to localize the source of emission along the line joining two detector elements in TOF PET systems.

In order to maintain a good signal-to-noise ratio in the images in the reconstruction process in TOF PET systems, it is important to measure the timing difference accurately. A systematic error or bias in the estimation of the timing difference between photon detection in the two detector elements will translate into a shift of the estimated source of photon annihilation along the line joining two detector elements. Calibration errors can result in such a timing bias. For example, if the timing bias is 0.1 ns, the reconstruction process shifts the data along the line between the detector elements by 1.5 cm. Reconstruction of images with these timing biases will result in image noise, particularly if the timing bias is large compared to the timing resolution of the detectors.

In known PET systems, timing errors are measured by introducing a known source distribution into the scan region of the PET system and thereby acquiring a TOF data set. Since the location of the activity is known, the expected timing difference data may be computed, for example, if the activity is known to be at the midpoint of the line between two detectors, the expected timing difference is equal to zero. If the average measured timing data is not equal to the expected timing difference, the difference between the average measured timing data and the expected timing difference represents the TOF error for that detector element pair.

In known TOF PET systems, the photon arrival time is digitized and coincidence is determined by comparing the digital time stamps of each measured photon. In an effort to compensate for timing errors measured in the PET system, the detector signals are tuned or calibrated by introducing a variable amount of delay in the signal before it is digitized in each detector element. However, a system with a large number of detector elements will, for reasons of economy of manufacture, use a common set of electronics to process a group of detector elements. It is commonly not known which detector within the group has received a photon, and therefore which value of the delay should be applied to the signal before the signal is digitized and processed. Therefore, differences in the timing bias among the detectors in a group cannot be individually corrected, and if these differences are significant there will be a loss of accuracy in the reconstructed image.

Another known method of calibrating a TOF PET system is to introduce a delay after the signal is digitized, by changing the digital time stamp. In this event, the timing bias of a particular detector element is adjusted by changing the digital time stamp according to the least significant bit (LSB) of the digital circuit. As a result, the timing signal of each individual detector element can only be adjusted in multiples of the LSB, even though the system may have the capability to determine that the timing is a fraction of the LSB. The adjustment can reduce the timing bias to only ±½ LSB. Because this occurs for each of the two photons in the coincidence pair, the timing bias of the coincidence pair may be as large as ±1 LSB. For example, if the LSB is 50 ps, it corresponds to a location error of up to ±1.5 cm along the coincidence line of response.

Moreover, the timing biases of a plurality of detector element pairs are not stable, for example, due to time, temperature variations affecting the electronic components, and the like. Therefore, the timing biases measured during the calibration procedure may not be accurately applied to subsequent acquired scan data, resulting in degradation of the reconstructed image.

BRIEF DESCRIPTION OF THE INVENTION

In one exemplary embodiment of the invention, a method for reconstructing an image in a time-of-flight (TOF) positron emission tomography (PET) system is provided. The method includes determining predicted timing information using a reconstructed image. The method also includes updating timing bias data, based on received timing information associated with acquired scan data and predicted timing information. The method further includes reconstructing the image, based on the updated timing bias data.

In another exemplary embodiment of the invention, a PET system is provided. The PET system includes a plurality of detector elements configured to acquire scan data. The PET system further includes a processor configured to reconstruct an image using predetermined timing bias data and acquired scan data from the detector elements. The acquired scan data includes timing information. The processor is further configured to use the reconstructed image to determine predicted timing information, and thereafter to determine differences between the predicted timing information and the received timing information associated with the acquired scan data. The processor then calculates updated timing bias data, based on the differences.

DETAILED DESCRIPTION OF THE INVENTION

Various embodiments of the invention provide a method and system for reconstructing an image in a positron emission tomography (PET) system.

Figure 1:
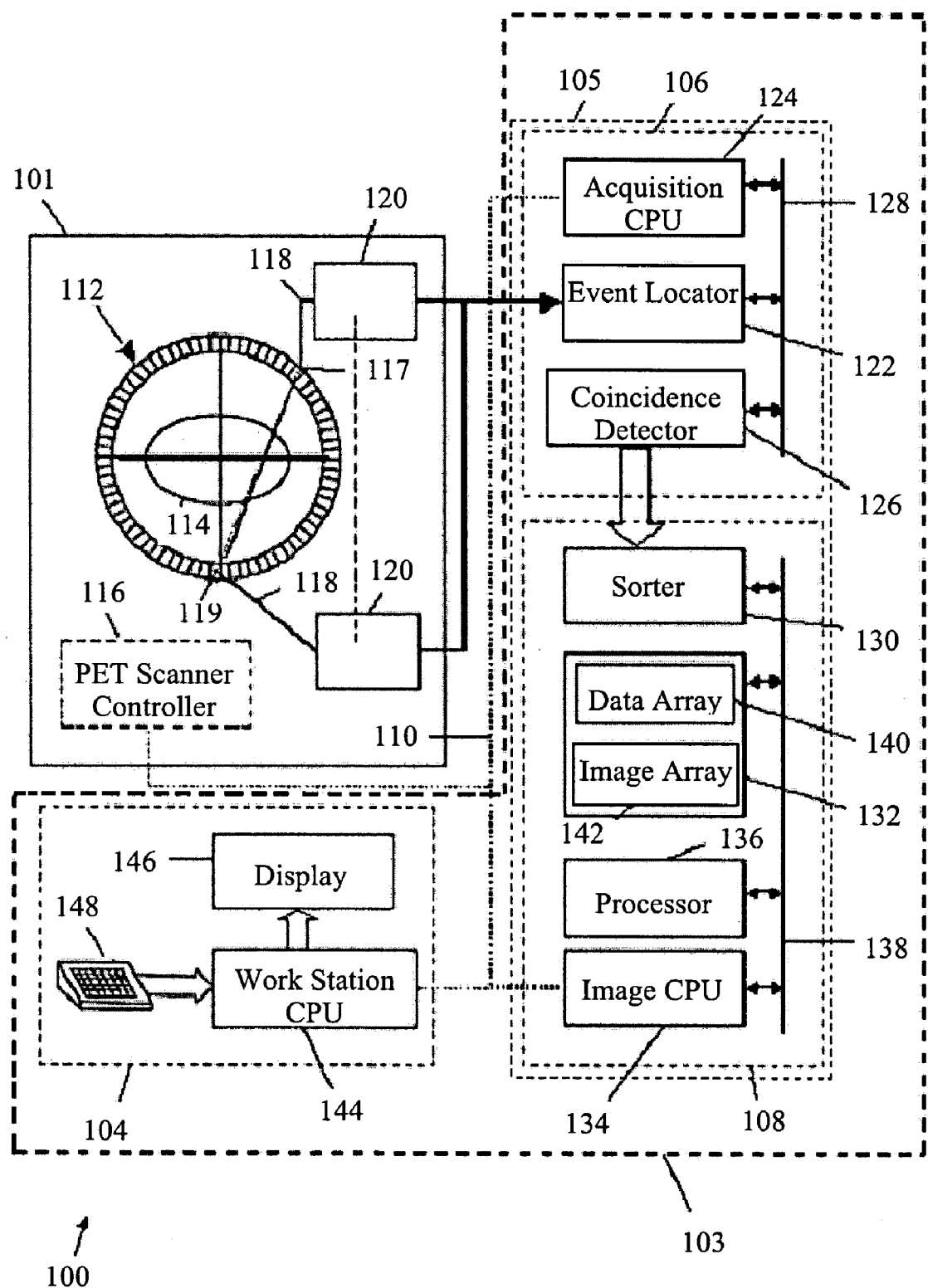
FIG. 1 is a block diagram illustrating a positron emission tomography (PET) system in which various embodiments of the invention may be implemented.

FIG. 1 is a block diagram of an exemplary embodiment of a PET system 100 in which various embodiments of the invention may be implemented. PET system 100 includes a PET scanner 101 and a controller 103 to control normalization and image reconstruction processes. Controller 103 is also configured to correct losses in the normalization process due to dead time in the detector blocks of PET scanner 101. The correction is performed by using the various embodiments described herein. Controller 103 includes an operator workstation 104 and a processor 105. Processor 105 includes a data acquisition processor 106 and an image reconstruction processor 108. PET scanner 101, operator workstation 104, data acquisition processor 106 and image reconstruction processor 108 are interconnected via a communication link 110 (e.g., a serial communication or wireless link). PET scanner 101, which typically includes a gantry (not shown), acquires scan data and transmits the data to data acquisition processor 106. The operation of PET scanner 101 is controlled from operator workstation 104. The data acquired by data acquisition processor 106 is reconstructed using image reconstruction processor 108.

PET scanner 101 may operate, using, for example, a plurality of detector rings. One such detector ring, detector ring 112, is illustrated in FIG. 1. Detector ring 112 includes a central opening, in which an object 114 (e.g., a patient) may be positioned, using, for example, a motorized table that is aligned with the central axis of detector ring 112. This motorized table moves object 114 into the central opening of detector ring 112, in response to one or more commands received from operator workstation 104. A PET scanner controller 116, also referred to as a gantry controller, is provided (e.g., mounted) in PET scanner 101. PET scanner controller 116 responds to the commands received from operator workstation 104 through communication link 110. Therefore, the operation of PET scanner 101 is controlled from operator workstation 104 through PET scanner controller 116.

Detector ring 112 includes a plurality of detector elements for performing a PET scan of object 114. For example, in the GE Discovery™ ST PET system, there are 420 crystals per ring and 24 rings in the scanner. As shown in FIG. 1, detector ring 112 includes a first detector element 117, a second detector element 119, and several other detectors. It should be noted that the detector elements are referred to as first detector element and second detector element, only to differentiate their location in FIG. 1. First detector element 117, like the other detectors, includes a set of scintillator crystals arranged in a matrix that is disposed in front of a plurality of photomultiplier tubes (e.g., four tubes). When a photon collides with a crystal on a detector, it produces a scintilla on the crystal. Each photomultiplier tube produces an analog signal on communication line 118 when a scintillation event occurs. A set of acquisition circuits 120 is provided within PET scanner 101 to receive these analog signals. Acquisition circuits 120 produce digital signals indicating the location and total energy of the event. Acquisition circuits 120 also produce an event detection pulse that indicates the time at which the scintillation event was detected. These digital signals are transmitted through a communication link, for example, a cable, to an event locator circuit 122 in data acquisition processor 106.

Data acquisition processor 106 includes event locator 122, an acquisition CPU 124, and a coincidence detector 126. Data acquisition processor 106 periodically samples the signals produced by acquisition circuits 120. Acquisition CPU 124 controls communications on a back-plane bus 128 and on communication link 110. Event locator circuit 122 processes the information pertaining to each valid event and provides a set of digital numbers or values indicative of the detected event. For example, this information indicates when the event took place and the identity of the scintillation crystal that detected the event. An event data packet is communicated to coincidence detector 126 through back-plane bus 128. Coincidence detector 126 receives the event data packets from event locator circuit 122 and determines if any two of the detected events are in coincidence. In this context, the coincidence is determined by a number of factors. First, the time markers in each event data packet must be within a predetermined time period, for example, 6 ns, of each other. Secondly, the line of response (LOR) formed by a straight line joining the two detectors that detect the coincidence event should pass through the field of view in PET scanner 101. Events that cannot be paired are discarded. Coincident event pairs are recorded as a coincidence data packet that is communicated through a communication link to a sorter 130 in image reconstruction processor 108.

Image reconstruction processor 108 includes sorter 130, a memory module 132, an image CPU 134, an array processor 136, and a back-plane bus 138. Sorter 130 counts all events that occur along each projection ray and organizes them into a coincidence data set. In an embodiment of the invention, this data set is organized as a data array 140, referred to as a sinogram. Data array 140 is stored in memory module 132. Back-plane bus 138 is linked to communication link 110 through image CPU 134, which controls communication through back-plane bus 138. Array processor 136 is also connected to back-plane bus 138, receives data array 140 as an input, and reconstructs images in the form of image arrays 142. Resulting image arrays 142 are stored in memory module 132.

The images stored in image array 142 are communicated by image CPU 134 to operator workstation 104. Operator workstation 104 includes a CPU 144, a display device 146, and an input device 148. CPU 144 connects to communication link 110 and receives inputs (e.g., user commands) from input device 148, which may be, for example, a keyboard, mouse, or a touch-screen panel. The operator can control the calibration of PET scanner 101, the configuration of PET scanner 101, and the positioning of object 114 for a scan through input device 148 and associated control panel switches. Similarly, the operator can also control the display of the resulting image on display device 146 and perform image-enhancement functions, using programs executed by workstation CPU 144.

Processor 105 is configured to process the scan data received from the detector elements. The scan data includes, for example, sinogram and timing information that is received by processor 105 from the detector elements during an imaging scan. The timing information in one embodiment is the difference in time at which two photons emitted in an annihilation event are detected by detector elements. The timing information may include time stamp information relating to a measured photon event detected by a pair of detector elements, for example, first detector element 117 and second detector element 119, for PET system 100. Time stamp information is the time at which each photon is detected by a detector element. Further, processor 105 is configured to process the timing bias data, as described in more detail herein. Timing bias is an error in the timing data due to uncorrected timing errors in the detector elements and the associated electronics. Timing bias may be caused by digitizing of the timing signal with a certain quantization level referred to as the Least Significant Bit (LSB). Timing bias may also arise from changes in the timing performance of the detector elements and associated electronics since the last timing calibration procedure.

The timing information is received by detectors, which include, for example, a block of 36 scintillator crystals attached to a 4-channel photomultiplier tube (PMT). The scintillator crystals convert the incoming photon from the patient into a plurality (e.g., several thousand) of light photons (e.g., visible or near UV), which are detected by the PMT(s). The proportion of light photons detected by each PMT channel is used to determine which of the 36 crystals received the incoming photon. The timing signal is determined by processing the leading edge of the PMT signals, to estimate the arrival of the light photons at the PMTs. This timing signal is then digitized and processed subsequently.

Timing information is received from a Time-of-flight (TOF) PET system during an image acquisition scan of an object, using the TOF PET system as is known. Based on the received timing bias data and the timing information, an image of the object is reconstructed.

Determination of timing bias data includes measuring the timing differences of the detector elements within the TOF PET system. Measuring the timing differences includes performing a calibration scan for each of the detector elements used to calibrate PET system 100.

Image reconstruction processor 108 determines the timing bias of each detector element pair from a timing spectrum, which is estimated from a reconstructed image. An image is generated from the measured sinogram array through an image reconstruction algorithm, for example, a Filtered Back-Projection (FBP) reconstruction. In the FBP reconstruction, a Fourier transform is performed on each row of the sinogram array and each row is then multiplied by a one-dimensional filter array. The filtered data is then inverse Fourier transformed to produce a filtered sinogram array. Each element of the filtered sinogram array is then projected back to obtain an image. The timing bias for each detector element pair is computed from the difference between estimated timing spectrum and measured timing spectrum (TOF sinogram array). A timing bias matrix $B(r, \theta)$ is generated based on the timing bias data of all the detector element pairs. If the difference for a particular detector element pair as determined by r and $\theta$, is found to be zero or above a pre-determined threshold, the detector element pair is deemed to have no timing bias. The timing bias matrix, $B(r, \theta)$, can be used to generate the final image using computationally more expensive reconstruction algorithms like statistical iterative reconstruction.

The timing information and timing bias data are used to reconstruct an image of object 114, scanned by PET system 100. The reconstruction may include, for example, a two-dimensional or three-dimensional reconstruction. The timing bias data may include average timing bias data relating to the detector elements in PET system 100. The timing bias data of each detector element is configured as a timing bias matrix with a timing bias value for each set of projection rays of PET system 100. It should be noted that a detector element pair detects the projection rays from a photon event. The timing bias data of each detector element pair corresponding to the projection ray is stored in memory module 132 of PET system 100.

In the reconstruction of an image, the timing biases for the detector element pairs are used to determine the point along a line joining a pair of detector elements at which a photon event occurred. For example, from the timing bias matrix, it may be determined that the timing bias in a detector element pair is 200 ps towards first detector element 117. Using a conversion factor of 15 cm/ns, which is half the speed of light (half the speed of light is used because two photons are traveling in opposite directions simultaneously), the 200 ps timing bias is equivalent to a distance of 3 cm. Therefore, if there is a photon event with a timing difference of zero, this generally indicates that the photon event occurred at the midpoint of the line joining the two detector elements. However, since the timing bias in the detector element pair is towards first detector element 117, the zero time stamp data of the photon event occurred at a point 3 cm towards first detector element 117.

There are two main types of image reconstruction algorithms, as are known, that can be used to reconstruct an image in a TOF PET system, analytical image reconstruction, (e.g., confidence-weighted filtered-back projection) and iterative reconstruction, (e.g., confidence-weighted maximum-likelihood expectation maximization). Both of these algorithms for image reconstruction are based on the fundamental operation of confidence-weighted back-projection, which converts the counts detected by a detector element pair/time bin combination back into image space. This is performed by distributing the counts (in appropriate proportions) to appropriate locations along the line joining the two detector elements, based on the probability that a coincidence event arising from that location will produce the measured timing difference. It should be noted that any reconstruction algorithm may be used from the ones described herein, modified as desired or required. It should also be noted that in an embodiment, the TOF PET system includes multiple timing bins, each corresponding to a different measured timing difference. Each time bin represents a different location on the line joining two detector elements, for example, first detector element 117 and second detector element 119. The bin representing time t=0 represents the midpoint between the two detector elements. The bins with positive time stamps are located towards one detector element, while those with negative time stamps are located towards the other detector element.

If there are timing biases in the detector elements, the assignment process as described above, is shifted in proportion to the timing bias corresponding to each detector element pair. The timing biases in the detector elements result from the imperfection in the timing calibration of the detector elements. Due to the presence of timing biases in the detector elements, coincidences arising from the point midway between the detector element pairs may not be expected to produce zero timing difference in the detector elements. Commonly assigned U.S. patent application Ser. No. 11/026, 236 titled "Method and system for controlling a positron emission tomography system", is incorporated herein by reference. This is further described in conjunction with FIG. 2.

Figure 2:
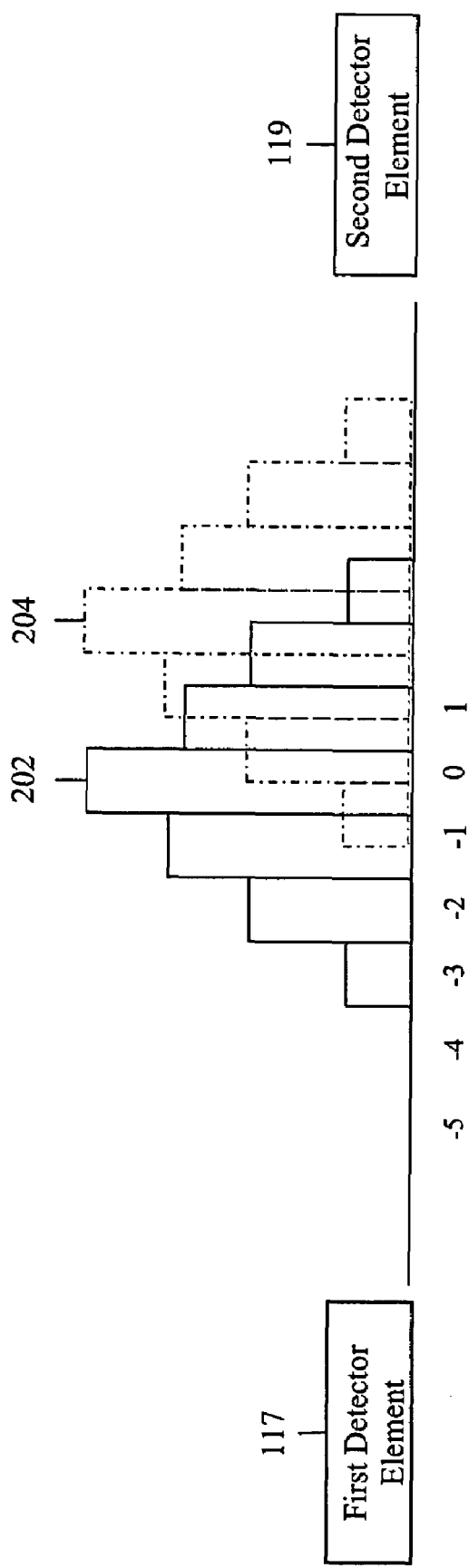
FIG. 2 is a diagram illustrating the application of timing bias data to the timing information in the reconstruction process, in accordance with an exemplary embodiment of the invention.

FIG. 2 illustrates the application of timing bias data to timing information in the reconstruction process, in accordance with an exemplary embodiment of the invention. Bars 202 represent the timing information indicating the probability of a photon event occurring at different points along the line joining two detector elements, for example, first detector element 117 and second detector element 119. This probability data is then assembled with the timing bias data from the timing bias matrix for each detector element pair, to shift the timing bins along the line joining first detector element 117 and second detector element 119, as shown by dotted bars 204. As shown in FIG. 2, first detector element 117 and second detector element 119 are used to detect a photon event. If the timing bias in detector element pair is 3 cm towards second detector element 119, bars 202 are shifted by 3 cm towards second detector element 119. After shifting the timing bins, the appropriate pixels along the line joining the two detector elements are incremented by known methods to reconstruct a high-resolution image.

Figure 3:
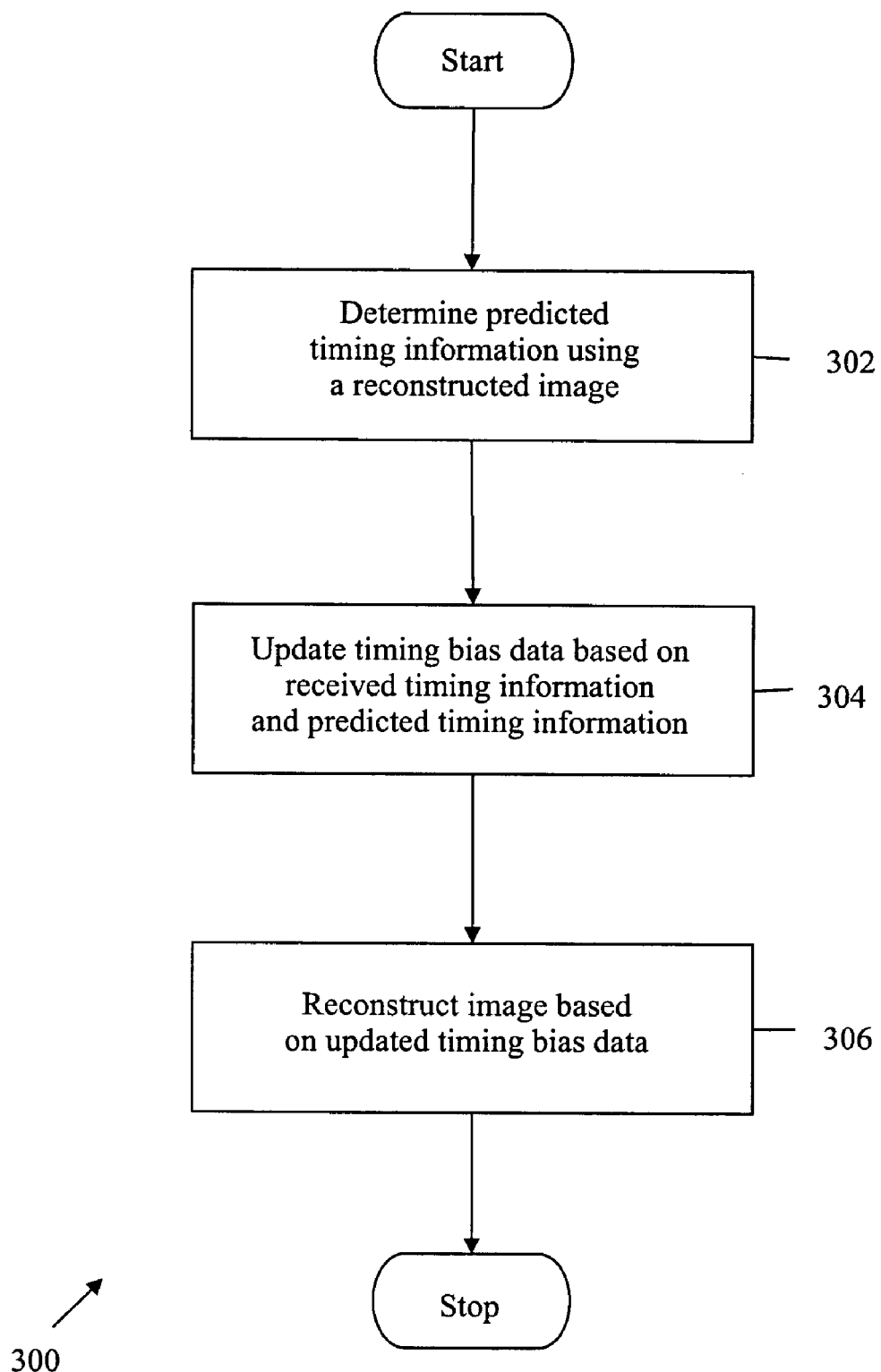
FIG. 3 is a flowchart illustrating a method for reconstructing an image in a PET system, in accordance with an embodiment of the invention.

FIG. 3 is a flowchart illustrating a method 300 for reconstructing an image in PET system 100, in accordance with an embodiment of the invention. In an embodiment of the invention, method 300 may be implemented in a TOF PET system. Data acquisition processor 106 acquires scan data during an image acquisition scan. The scan data is hereinafter referred to as acquired scan data. At 302, a reconstructed image based on the acquired scan data and predetermined timing bias data is used to determine predicted timing information.

At 304, the predetermined timing bias data is updated based on received timing information associated with the acquired scan data and predicted timing information. This is further explained in conjunction with FIG. 4. In various embodiments of the invention, the timing bias data includes information relating to the timing differences between corresponding detector element pairs in PET system 100.

In an embodiment of the invention, the predetermined timing bias data is the best available timing bias data provided by the timing bias matrix. In another embodiment of the invention, the predetermined timing bias data is determined by comparing previous PET image acquisition scans. In yet another embodiment of the invention, the predetermined timing bias data is determined by means of a calibration scan. The calibration scan may be performed by PET system 100 for a plurality of detector element pairs.

At 306, the image is reconstructed, based on the updated timing bias data. Image reconstruction processor 108 acquires the updated timing bias data from memory module 132 and thereafter reconstructs the image. In an embodiment of the invention, the image reconstruction may be a two-dimensional reconstruction. In another embodiment of the invention, the image reconstruction may be a three-dimensional reconstruction.

Figure 4:
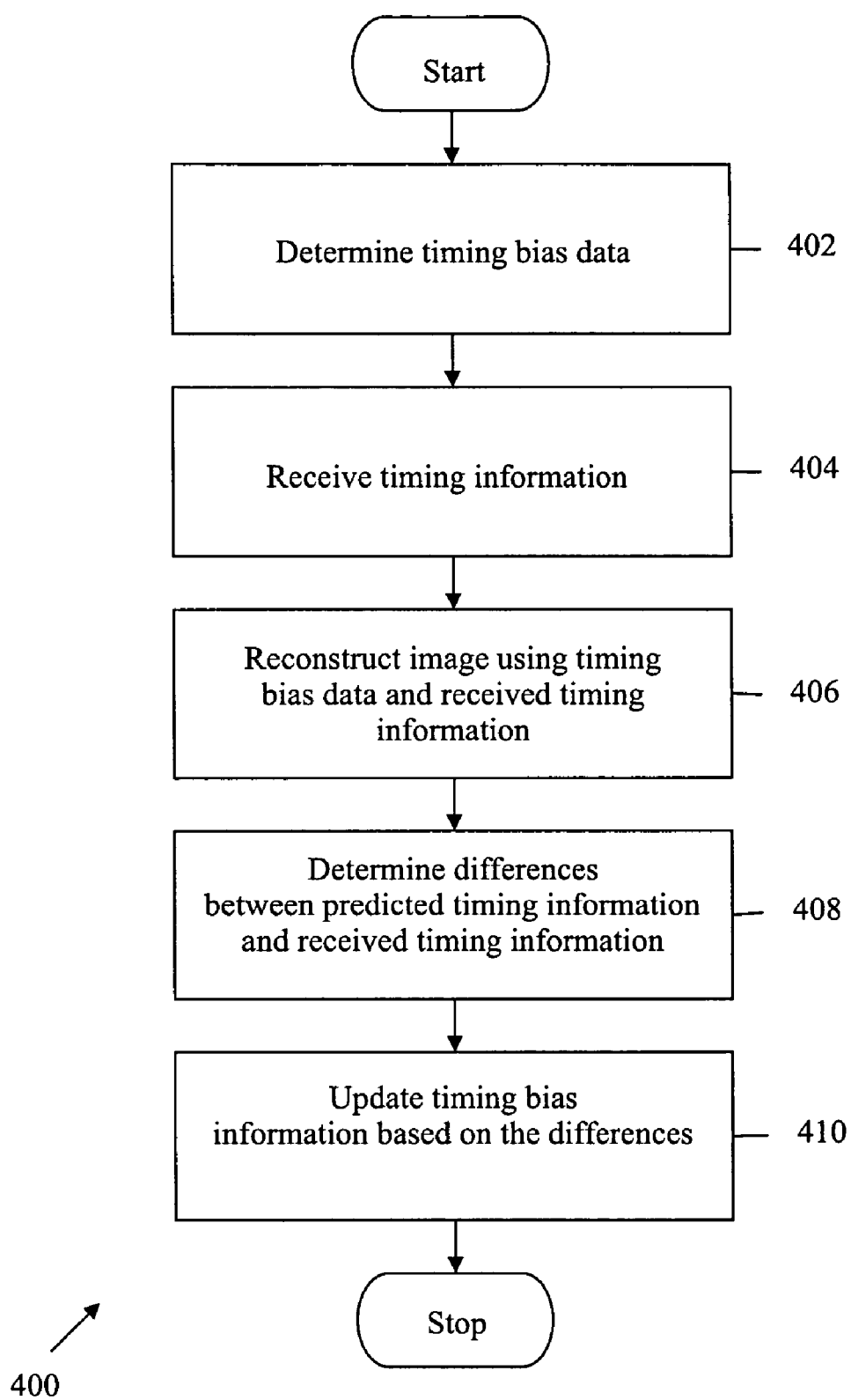
FIG. 4 is a flowchart illustrating a method for performing image reconstruction in a PET system, in accordance with an embodiment of the invention.

FIG. 4 is a flowchart illustrating a method 400 for performing image reconstruction in PET system 100, in accordance with an embodiment of the invention. In an embodiment of the invention, method 400 may be implemented in a TOF PET system. A timing bias data for a plurality of detector element pairs in PET system 100 is determined at 402.

Processor 105 receives timing information from acquired scan data at 404. In various embodiments of the invention, the timing information includes the time stamp information relating to a measured photon event for PET system 100. Processor 105 also stores the timing bias data in memory module 132 of PET system 100. Image reconstruction processor 108 reconstructs the image, based on the received timing information and the timing bias data at 406. The reconstructed image is back projected to derive predicted timing information. At 408, differences between the predicted timing information and the received timing information are determined. At 410, the timing bias data is updated, based on the differences between the predicted timing information and the received timing information.

In an embodiment of the invention, the updating of the timing bias data and reconstruction of the image, based on the updated timing bias data, may be iteratively performed. This is further explained in conjunction with FIG. 5.

Figure 5:
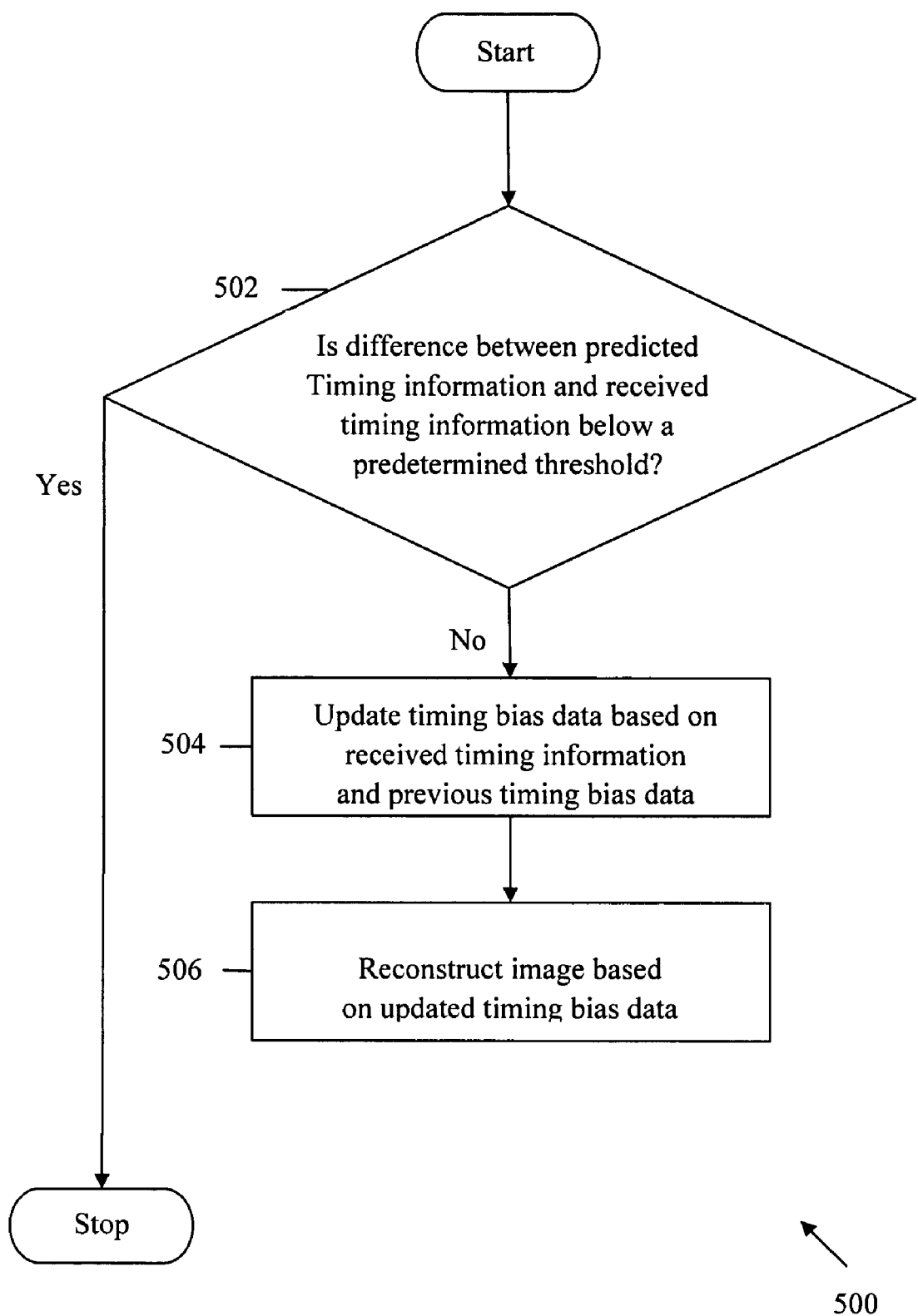
FIG. 5 is a flowchart illustrating a method for iteratively updating timing bias data, in accordance with an embodiment of the invention.

FIG. 5 is a flowchart illustrating a method 500 for iteratively updating timing bias data in PET system 100, in accordance with an embodiment of the invention. At 502, differences between the predicted timing information and the received timing information are compared with a pre-determined threshold. In an embodiment of the invention, the pre-determined threshold may be a timing difference corresponding to the desired timing resolution error of the system. For example, a one cm timing error would correspond to a threshold of 67 ps. In an embodiment of the invention, the differences between the predicted timing information and the received timing information corresponding to a low activity region in the field of view of PET system 100 are compared with the pre-determined threshold. In yet another embodiment of the invention, the differences between the predetermined timing bias data and the updated timing bias data are compared, to determine whether the timing bias data is to be updated.

If the differences between the predicted timing information and the received timing information are less than the pre-determined threshold, the timing bias data is not updated further. However, if the differences between the predicted timing information and the received timing information are greater than the pre-determined threshold, the steps of updating timing bias data at 504 and reconstructing image at 506 are performed iteratively.

In an embodiment of the invention, the trends in the differences between the updated timing bias data and predetermined timing bias data are stored for a plurality of acquisitions. These trends are then used to determine if a calibration procedure is required to compute the pre-determined timing bias data.

In various embodiment of the invention, PET system 100 stores the updated timing bias data, including the timing bias value for each set of projection rays. In an embodiment of the invention, memory module 132 is configured to store the updated timing bias data in the timing bias matrix configuration.

In various embodiments of the invention, processor 105 of PET system 100 is configured to reconstruct an image by using predetermined timing bias data and the received timing information, to determine the predicted timing information, based on the reconstructed image. The received timing information is determined by processor 105 from the acquired scan data. Processor 105 is also configured to determine the differences between the predicted timing information and the received timing information, so as to calculate the updated timing bias data. Processor 105 is further configured to repeat the process of image reconstruction, using the calculated updated timing bias data.

In various embodiments of the invention, an additional point source of activity may be included in the field of view of PET system 100. This is further explained in conjunction with FIG. 6.

Figure 6:
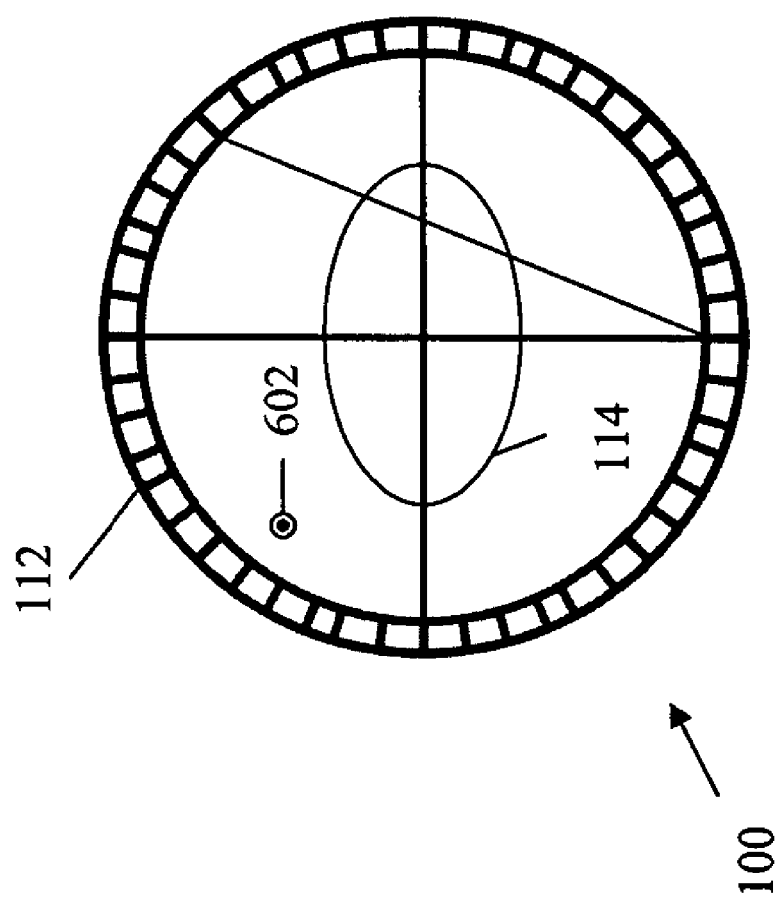
FIG. 6 is a block diagram illustrating a point source of activity in the PET system, in accordance with an embodiment of the invention.

FIG. 6 is a block diagram illustrating a point source of activity 602 in PET system 100, in accordance with an embodiment of the invention. PET system 100 further includes point source of activity 602 in the field of view. Point source of activity 602 is placed away from the body of the patient so that it is less confounded by the activity within the patient, leading to a more accurate assessment of the timing biases in the detector.

Figure 7:
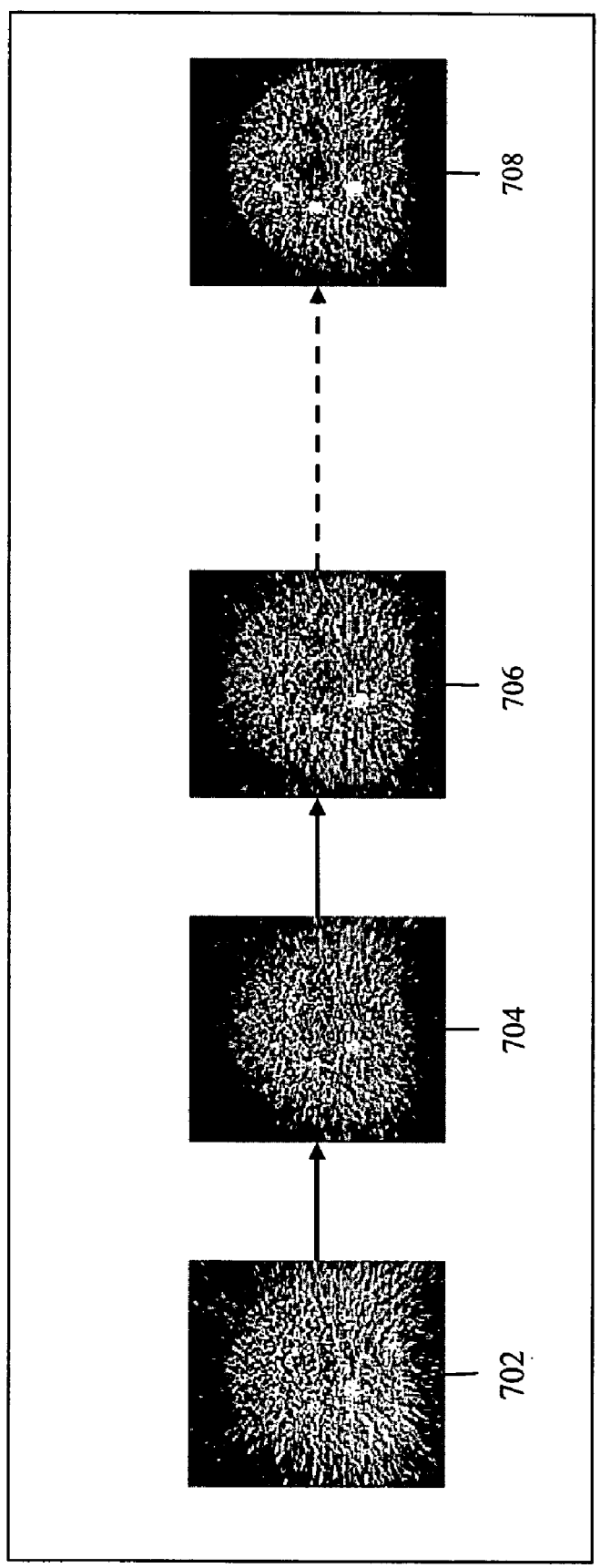
FIG. 7 illustrates reconstructed images, based on updated timing bias data after a plurality of iterations, in accordance with an exemplary embodiment of the invention.

FIG. 7 illustrates reconstructed images, based on timing bias data after a plurality of iterations, in accordance with an embodiment of the invention. An image 702 is reconstructed, based on the predetermined timing bias data and the received timing information. An updated set of timing bias data is computed based on the differences between predicted timing information and received timing information. An image 704, an image 706 and an image 708 are formed after subsequent iterations, based on updated timing bias data, as a result of which image 708 has better resolution and accuracy.

Various embodiments of the invention provide a method and system that updates the time bias data of a plurality of detector element pairs. The images reconstructed by using the updated timing bias data have better resolution and accuracy.

A technical effect of the various embodiments of the invention is to update the time bias data of a plurality of detector element pairs.

The various embodiments or components thereof may be implemented as part of a computer system. The computer system may include a computer, an input device, a display unit, and an interface, for example, for accessing the Internet. It may also include a microprocessor, which may be connected to a communication bus. The computer may include a memory, which may include Random Access Memory (RAM) and Read Only Memory (ROM), as well as a storage device, which may be a hard disk drive or a removable storage drive such as a floppy disk drive, optical disk drive, and the like. The storage device can also be other similar means for loading computer programs or other instructions into the computer system.

As used herein, the term 'computer' may include any processor-based or microprocessor-based system that includes systems using microcontrollers, reduced instruction set circuits (RISC), application-specific integrated circuits (ASICs), logic circuits, and any other circuit or processor capable of executing the functions described herein. The above examples are exemplary only, and are not intended to limit in any way the definition and/or meaning of the term 'computer'.

The computer system executes a set of instructions that are stored in one or more storage elements, in order to process input data. The storage elements may also hold data or other information, as desired or required. The storage element may be in the form of an information source or a physical memory element in the processing machine.

The set of instructions may include various commands that instruct the processing machine to perform specific operations, such as the processes of the various embodiments of the invention. The set of instructions may be in the form of a software program. The software may be in various forms, such as system software or application software. Further, the software may be in the form of a collection of separate programs, a program module within a larger program, or a portion of a program module. The software may also include modular programming in the form of object-oriented programming. The processing of input data by the processing machine may be in response to user commands, to results of previous processing, or in response to a request made by another processing machine.

As used herein, the terms 'software' and 'firmware' are interchangeable and include any computer program stored in memory, to be executed by a computer, including RAM memory, ROM memory, EPROM memory, EEPROM memory, and non-volatile RAM (NVRAM) memory. The above memory types are exemplary only and do not limit the types of memory used for storing a computer program.

While the invention has been described in terms of various specific embodiments, those skilled in the art will recognize that the invention can be practiced with modification within the spirit and scope of the claims.

What is claimed is:

1. A method for reconstructing an image in a time-of-flight (TOF) positron emission tomography (PET) system, said method comprising:

using a reconstructed image to determine predicted timing information;

updating timing bias data based on received timing information associated with acquired scan data and predicted timing information;

reconstructing the image based on the updated timing bias data; and iteratively performing the updating and reconstructing steps until the difference between the predicted timing information and received timing information is below a pre-determined threshold that is based only on the difference between the predicted timing information and the received timing information.

2. A method according to claim 1 wherein reconstructing the image comprises performing one of a two-dimensional and a three-dimensional reconstruction.

3. A method according to claim 1 further comprising including an additional source of activity within a field of view of the PET system.

4. A method according to claim 1 further comprising performing a calibration scan to determine predetermined timing bias data.

5. A positron emission tomography (PET) system comprising:

a plurality of detector elements configured to acquire scan data; and a processor configured to reconstruct an image using predetermined timing bias data and the acquired scan data from the detector elements, the acquired scan data including received timing information, said processor further configured to use the reconstructed image to determine predicted timing information, to iteratively determine differences between the predicted timing information and the received timing information associated with the acquired scan data, to calculate updated timing bias data based on the determined differences, and repeat the image reconstruction using the calculated updated timing bias data until the determined differences are below a pre-determined threshold that is based only on the determined differences between the predicted timing information and the received timing information.

6. A PET system according to claim 5 wherein the processor is further configured to determine received timing information from the acquired scan data.

7. A PET system according to claim 5 further comprising a source configured to include additional activity within a field of view of the PET system.

8. A PET system according to claim 5 wherein the updated timing bias data comprises a timing bias value for each of a set of projection rays of said PET system.

9. A PET system according to claim 5 further comprising a memory for storing the updated timing bias data in a timing bias matrix configuration.

10. A method for performing image reconstruction in a time-of-flight positron emission tomography (TOF PET) system, said method comprising:
- determining timing bias data for a TOF PET system;
- receiving timing information from the TOF PET system during an image acquisition scan of an object using the TOF PET system;
- reconstructing an image of the object using the timing bias data and the received timing information;
- using the reconstructed image to determine predicted timing information;
- iteratively determining differences between the predicted timing information and the received timing information;
- updating the timing bias data based on the determined differences; and
- repeating the image reconstruction using the updated timing bias data until the determined differences are below a pre-determined threshold that is based only on the determined differences between the predicted timing information and the received timing information.

11. A method according to claim 10 wherein the received timing information comprises time stamp information relating to a measured photon event for the TOF PET system.

12. A method according to claim 10 wherein the timing bias data comprises information relating to timing differences between corresponding detector element pairs within the TOF PET system.

13. A method according to claim 10 further comprising providing an additional source of activity within the image acquisition scan.

14. A method according to claim 1 further comprising storing the updated timing bias data in a timing bias matrix configuration.

15. A method according to claim 1 wherein updating timing bias data comprises determining a timing bias value for each of a set of projection rays.

16. A PET system according to claim 5 wherein the received timing information comprises time stamp information relating to a measure photon event within said PET system.

* * * * *

UNITED STATES PATENT AND TRADEMARK OFFICE
CERTIFICATE OF CORRECTION

PATENT NO. : 7,405,405 B2  Page 1 of 1
APPLICATION NO. : 11/131149
DATED : July 29, 2008
INVENTOR(S) : Charles William Stearn et al.

It is certified that error appears in the above-identified patent and that said Letters Patent is hereby corrected as shown below:

Column 12, line 19 claim 16 insert tion relating to a measured photon event within said PET Signed and Sealed this Seventh Day of October, 2008

JON W. DUDAS
*Director of the United States Patent and Trademark Office*